United States Patent
Wu

(10) Patent No.: US 9,945,120 B1
(45) Date of Patent: Apr. 17, 2018

(54) PLASTIC FORM AND MANUFACTURING METHOD THEREOF

(71) Applicant: Yu-Tsai Wu, New Taipei (TW)

(72) Inventor: Yu-Tsai Wu, New Taipei (TW)

( * ) Notice: Subject to any disclaimer, the term of this patent is extended or adjusted under 35 U.S.C. 154(b) by 0 days.

(21) Appl. No.: 15/585,181

(22) Filed: May 3, 2017

(51) Int. Cl.
| | |
|---|---|
| *E04C 2/22* | (2006.01) |
| *B29C 69/00* | (2006.01) |
| *E04G 9/05* | (2006.01) |
| *B29C 69/02* | (2006.01) |
| *B29K 509/08* | (2006.01) |
| *B29K 23/00* | (2006.01) |
| *B29K 105/26* | (2006.01) |
| *B29L 31/00* | (2006.01) |

(52) U.S. Cl.
CPC ............ *E04C 2/22* (2013.01); *B29C 69/001* (2013.01); *B29C 69/02* (2013.01); *E04G 9/05* (2013.01); *B29K 2023/12* (2013.01); *B29K 2105/26* (2013.01); *B29K 2509/08* (2013.01); *B29L 2031/757* (2013.01)

(58) Field of Classification Search
CPC ..... B29C 69/001; B29C 69/02; B29C 70/021; B29C 70/025; B29C 67/242; B29K 2023/12; B29K 2509/08; B29K 2105/26; E04C 2/22
USPC .......................... 428/188; 264/148, 151, 920
See application file for complete search history.

(56) References Cited

U.S. PATENT DOCUMENTS

| | | | | | |
|---|---|---|---|---|---|
| 2,410,744 | A | * | 11/1946 | Powers | C03B 13/14 156/471 |
| 2,445,290 | A | * | 7/1948 | Gonda | B29C 33/485 156/173 |
| 3,941,157 | A | * | 3/1976 | Barnett | B29C 47/0028 138/115 |
| 5,580,620 | A | * | 12/1996 | Campbell | E04C 2/543 428/120 |
| 6,482,498 | B1 | * | 11/2002 | Kawasaki | B01J 31/1616 422/177 |
| 6,821,609 | B2 | * | 11/2004 | Mende | B29C 47/0028 264/177.16 |
| 6,872,442 | B2 | * | 3/2005 | Yajima | B03B 9/06 428/107 |
| 7,416,368 | B2 | * | 8/2008 | Dagher | E02D 5/02 405/274 |
| 8,889,248 | B2 | * | 11/2014 | Thiagarajan | E04C 2/543 428/119 |
| 2003/0003252 | A1 | * | 1/2003 | Yun | B29C 44/18 428/36.9 |
| 2003/0215613 | A1 | * | 11/2003 | Jan | B29C 47/0028 428/188 |

(Continued)

*Primary Examiner* — Michael Safavi
(74) *Attorney, Agent, or Firm* — Leong C. Lei

(57) ABSTRACT

The plastic form is made from a plastic material mixed with a number of glass fiber particles, is formed by melting the plastic material and particles, and then by injection molding through distributing the melted material into a mold via a grid forming machine. The plastic form has a first piece, a second piece, an intermediate layer with a number of connection ribs and through channels. The through channel leads to light weight for convenient transportation and installation. The smooth first and second pieces lead to convenient stripping and well-finished concrete surfaces. The connection ribs enhance the plastic form's strength in withstanding deformation, contributing to the plastic form's reusability and environmental friendliness.

9 Claims, 7 Drawing Sheets

(56) References Cited

U.S. PATENT DOCUMENTS

| | | | | |
|---|---|---|---|---|
| 2003/0232177 | A1* | 12/2003 | Pearce | A23G 3/36 |
| | | | | 428/188 |
| 2004/0062915 | A1* | 4/2004 | Pabedinskas | B29C 47/0023 |
| | | | | 428/188 |
| 2005/0112331 | A1* | 5/2005 | Donea | B32B 3/12 |
| | | | | 428/166 |
| 2007/0178275 | A1* | 8/2007 | Takahashi | B01D 46/2418 |
| | | | | 428/116 |
| 2008/0038519 | A1* | 2/2008 | Hoolhorst | B32B 3/12 |
| | | | | 428/188 |
| 2013/0052429 | A1* | 2/2013 | Thiagarajan | E04C 2/296 |
| | | | | 428/188 |
| 2014/0319316 | A1* | 10/2014 | Bergman | E04G 9/05 |
| | | | | 249/48 |

* cited by examiner

PLASTIC FORM AND MANUFACTURING METHOD THEREOF

BACKGROUND OF THE INVENTION

(a) Technical Field of the Invention

The present invention generally relates to formworks and, more particularly, to a plastic form that is reusable, robust, and light-weight, and its manufacturing method.

(b) Description of the Prior Art

Conventionally, there are timber forms, plywood forms, and metallic forms for concrete construction formworks. For timber and plywood forms, as they are water-absorbent and their surfaces may be as such roughened, usually moisture-resistant coating has to be applied before grouting so as to prevent the subsequent difficulty of stripping timber or plywood forms, or the need for a second treatment to flatten the surface of the finished concrete object, which are time-consuming and laborious. The stripped timber or plywood forms may be reused for only 4 to 7 times. After that, the forms have to be abandoned, leading to high cost and environment unfriendliness.

As to solid metallic forms, their heavy weight requires machine loading and transportation, introducing higher construction difficulty and hazard. Metallic forms also cannot be processed in situ, and are mostly applied to constructions such as bridges, piers, ditches that require the forms to withstand heavy load.

SUMMARY OF THE INVENTION

An objective of the present invention is to provide a form that is deformation-free, environmentally friendly, and reusable.

Another objective of the present invention is to provide a form that is convenient and safe for transportation and installation.

Yet another objective of the present invention is to provide a form that is convenient to strip and the surface of the finished concrete is smoother.

To achieve the objectives, the plastic form is made from a raw material including a plastic material and glass fiber particles. The raw material is blended and heated up to 180 degree Celsius so that the raw material is melted. The melted raw material is fed to a hydraulic machine, which forces the melted material into a distribution machine. The melted material is then distributed into a mold through a grid forming machine. The plastic form is then formed through injection molding.

The plastic form has a main member including a first piece along a major face of the main member, a second piece along another major face of the main member opposite to the first piece, an intermediate layer sandwiched between the first and second pieces, and a number of connection ribs between the first and second pieces, partitioning the intermediate layer laterally and vertically and forming a number of through channels, where each through channel has openings at both ends.

The through channel leads to the plastic form's light weight for convenient transportation and installation. The smooth first and second pieces, and their water resistance leads to convenient stripping and well-finished concrete surfaces without an additional process.

The connection ribs enhance the plastic form's strength in withstanding deformation, contributing to the plastic form's high reusability and environmental friendliness. Compared to the prior art, the present invention does not require moisture-resistant coating before grouting, and is free from the subsequent difficulty of stripping, or the need for a second treatment to flatten the surface of the finished concrete object.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
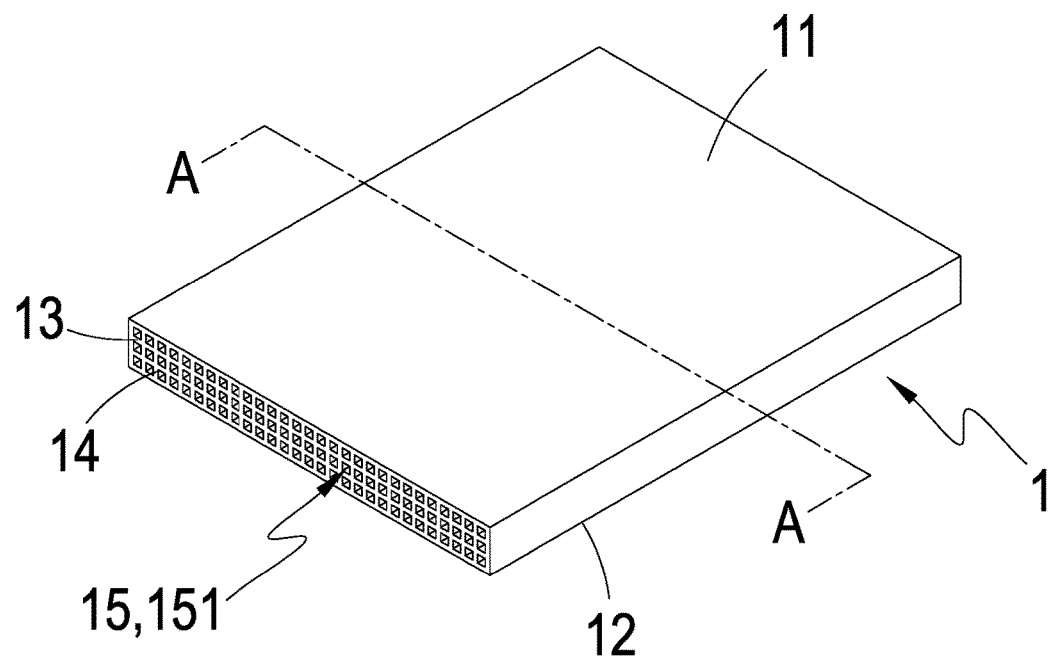
FIG. 1 is a perspective diagram showing a plastic form according to an embodiment of the present invention.
Figure 2:
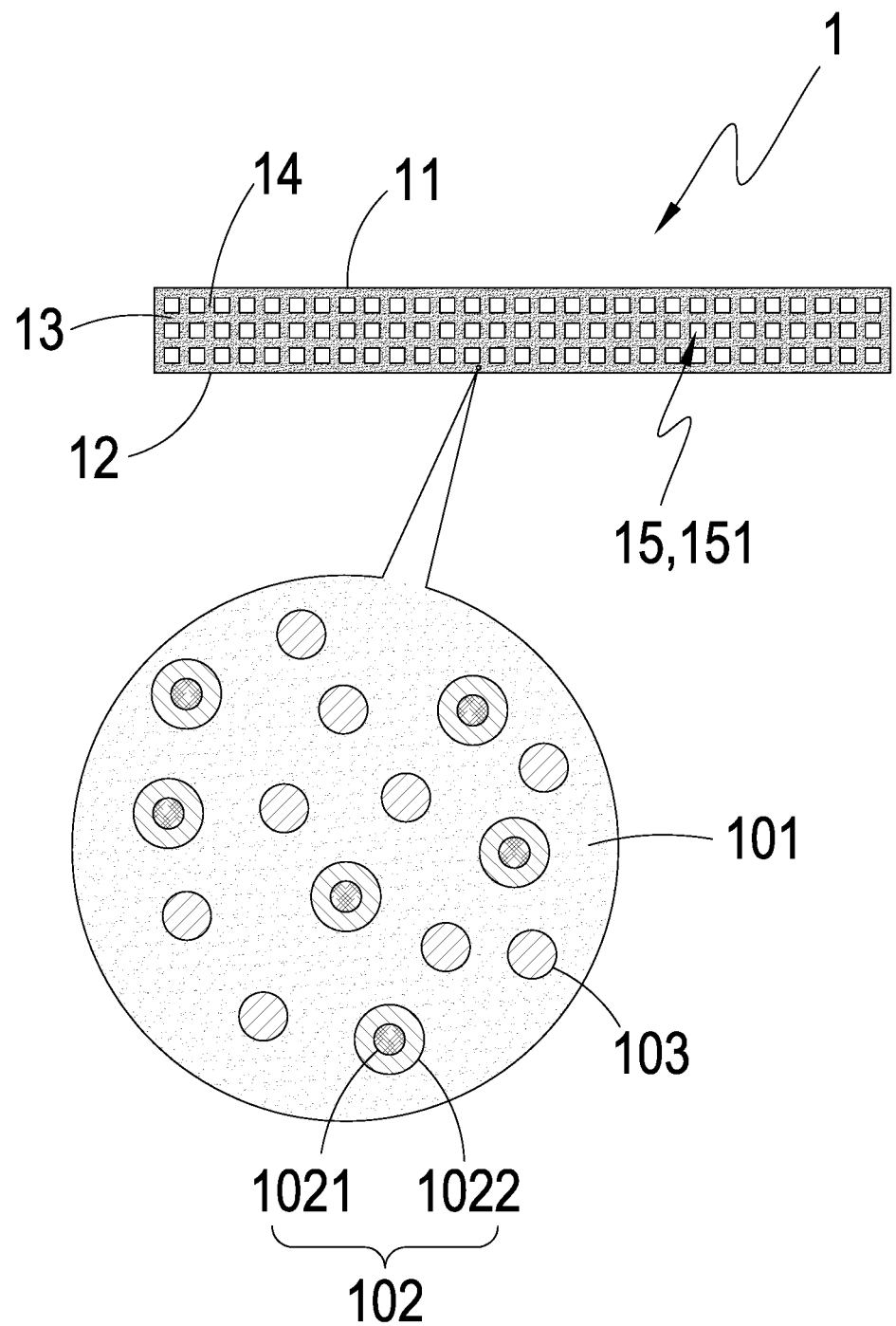
FIG. 2 is a cross-sectional diagram showing the plastic of FIG. 1 form along A-A line of FIG. 1.
Figure 3:
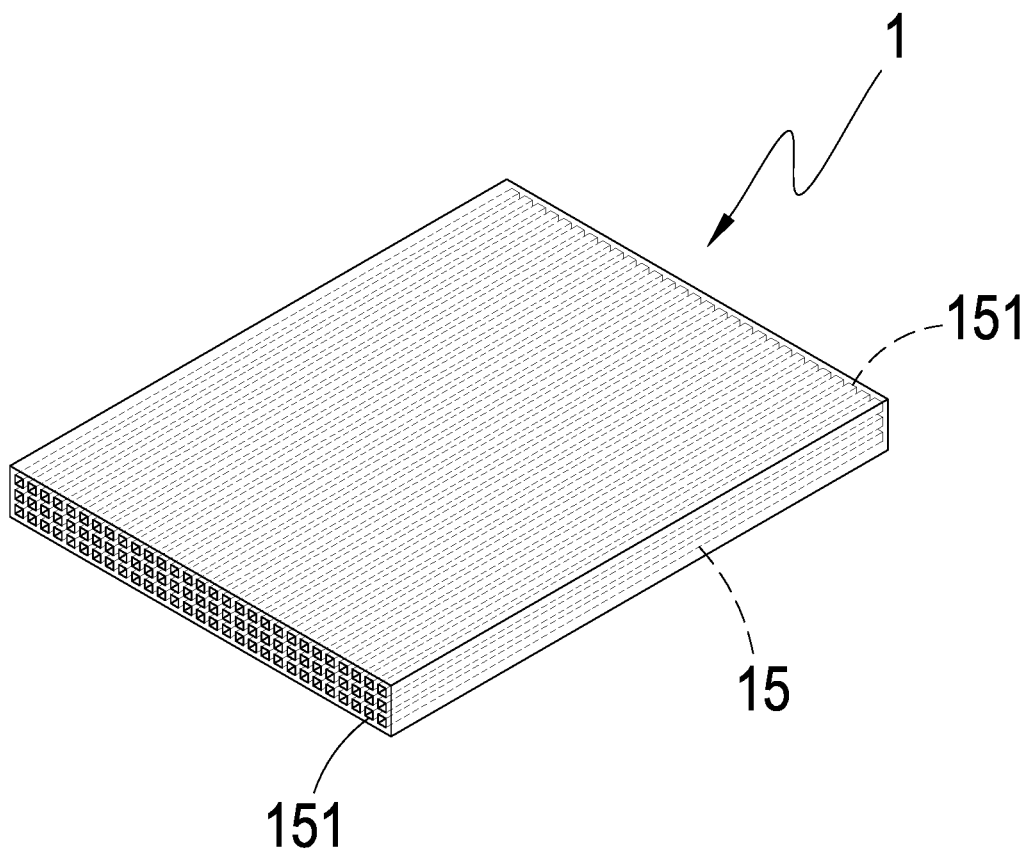
FIG. 3 is a perspective schematic diagram showing the plastic form of FIG. 1 transparently.

As shown in FIGS. 1 to 3, a plastic form according to an embodiment of the present invention includes a flat main member 1. The main member 1 includes a first piece 11, a second piece 12, an intermediate layer 13, and a number of connection ribs 14. The main member 1 is integrally formed from at least a plastic material 101 mixed with a number of first particles 102 made of at least a glass fiber material. Each first particle 102 includes at least a glass fiber core 1021 and a reinforced glass fiber cladding 1022 wrapping the glass fiber core 1021. The plastic material 101 may be further mixed with a number of second particles 103 made of at least a rock material so that the main member 1 is not water-absorbent.

Each second particle 103 may be a rock powder or a calcium carbonate powder. The plastic material 101 may be obtained from recycled plastic from various fields such as automobile parts, household items, electronic parts, industrial waste, or non-toxic polypropylene (PP), and is non-toxic, acid-resistant, alkali-resistant, abrasion-resistant, non-ageing, environmentally friendly, and not affecting cement quality.

The first piece 11 is along a major face of the main member 1, and the second piece 12 is along another major face of the main member 1 opposite to the first piece 11. Both first and second pieces 11 and 12 have smooth surfaces. The intermediate layer 13 is sandwiched between the first and second pieces 11 and 12. The connection ribs 14 are between the first and second pieces 11 and 12, and partition the intermediate layer 13 laterally and vertically so as to enhance the main member 1's structural strength to withstand impact and deformation, thus forming a number of parallel through channels 15. According to test, the main member 1 therefore may be re-used more than 20 times.

The channels 15 are arranged between the first and second pieces 11 and 12, and each is surrounded by the connection ribs 14 with two openings 151 at its two ends. The main member 1 therefore has a grid-like cross-section, and a reduced weight. The arrangement of the channels 15 is not limited as such.

Figure 4:
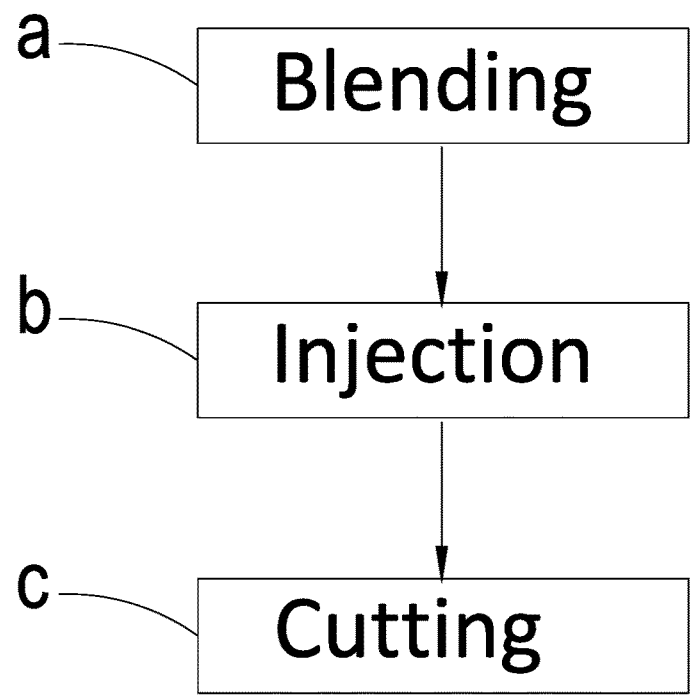
FIG. 4 is a flow diagram showing the steps of manufacturing a plastic form according to an embodiment of the present invention.
Figure 5:
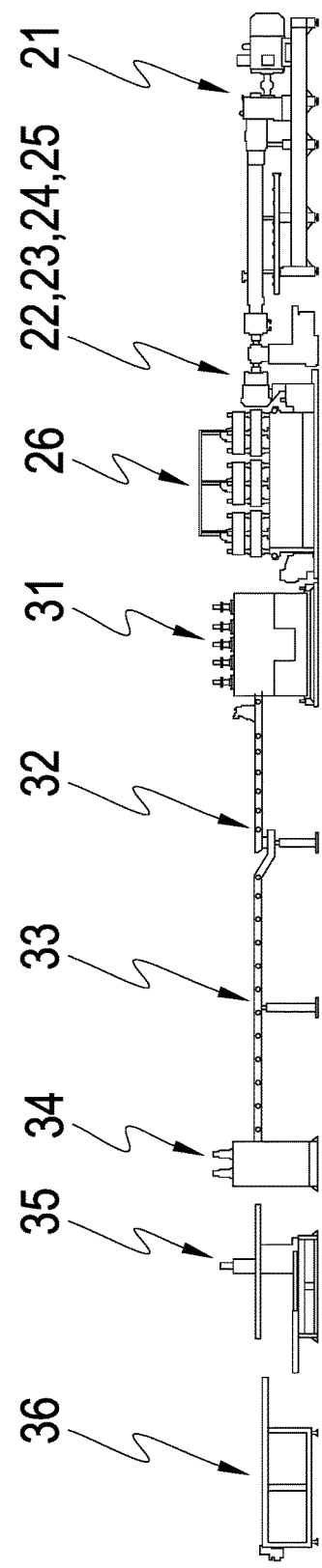
FIG. 5 is a schematic diagram showing a production line for a plastic form according to the steps of FIG. 4.

As shown in FIGS. 4 and 5, the manufacturing of the plastic form mainly involves three major steps: (a) blending; (2) injection; and (3) cutting.

In step (a) blending, the plastic material 101 is mixed with first and second particles 102 and 103, and is stirred so that the particles 102 and 103 are uniformly distributed. The plastic material 101 mixed with particles 102 and 103 is then fed into an extrusion machine 21, and heated above 180 degree Celsius so that the material 101 and the particles 102 and 103 are melted together. The melted plastic material 101 and first and second particles 102 and 103 are delivered to a hydraulic machine 22.

In step (b) injection, the hydraulic machine 22 pressurizes and feeds the melted plastic material 101 and first and second particles 102 and 103 into a distribution machine 23 that uniformly distributes the melted plastic material 101 and first and second particles 102 and 103 into a grid forming machine 24. Through the grid forming machine 24, the melted plastic material 101 and first and second particles 102 and 103 enter a mold 25 for molding into the main member 1 having the first piece 11, the second piece 12, the intermediate layer 13, and a number of connection ribs 14, with a number of parallel through channels 15 as described above. The grid forming machine 24 and the mold 25 jointly control the thickness and width of the main member 1.

In step (c) cutting, the main member 1 is cut and cooled down. More specifically, there are a sub-step (c1) where the main member 1 is delivered to a shaping machine 26 for shaping, a sub-step (c2) where the main member 1 after shaping is pulled to a first cutting device 32 by a first traction machine 31 and the main member 1's rims are pruned, a sub-step (c3) where the pruned main member 1 is delivered to a cooling rack 33 for cooling, a sub-step (c4) where the cooled main member 1 is pulled to a second cutting device 35 by a second traction machine 34, and the main member 1 is cut according to a desired length, and a sub-step (c5) where the cut main member 1 is carried by a transportation device 36.

As described above, the main member 1 is integrally formed with reduced manufacturing time and, as there are multiple through channels 15, the material cost is also lowered.

Figure 6:
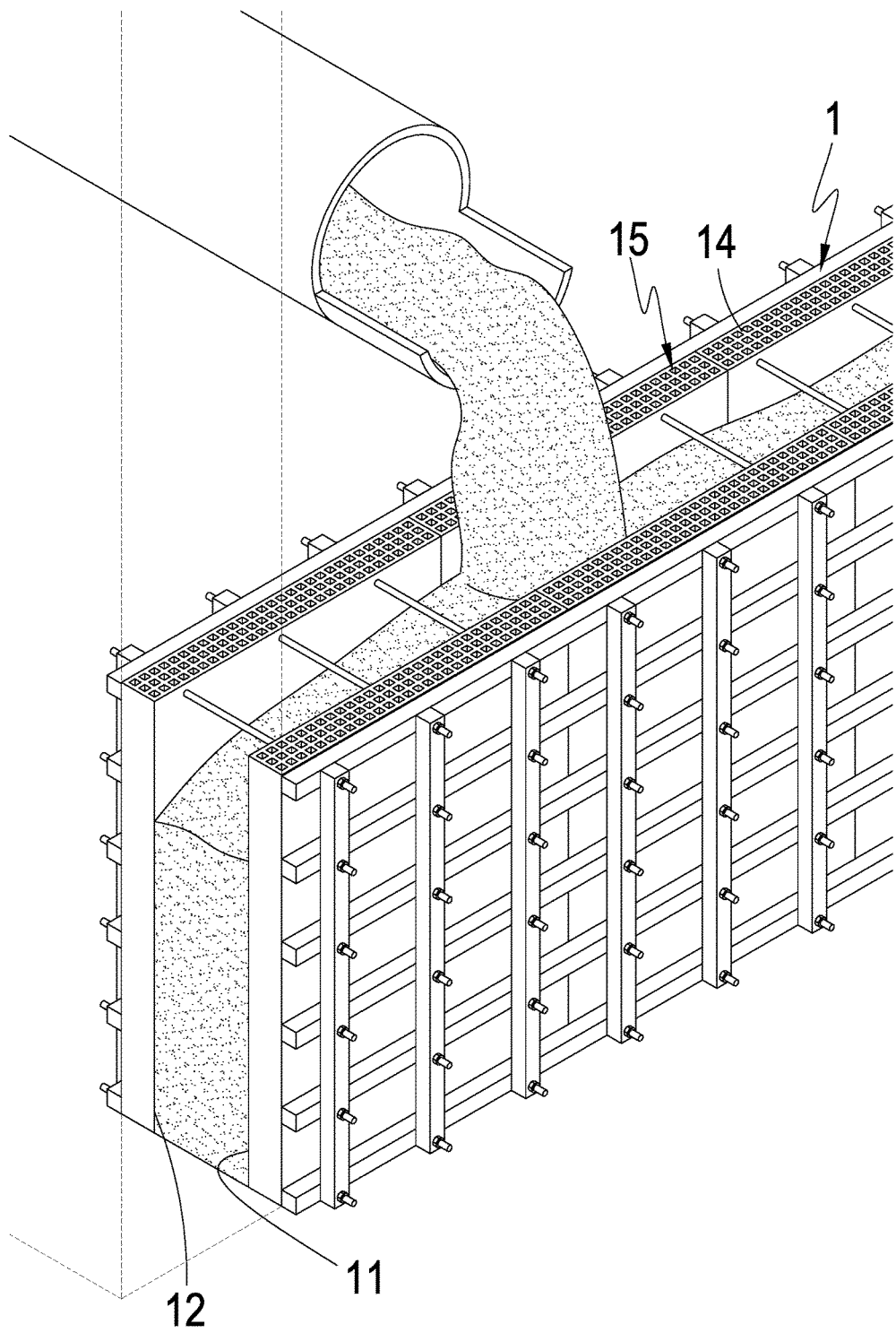
FIG. 6 is a perspective diagram showing plastic forms of the present invention applied to a formwork.
Figure 7:
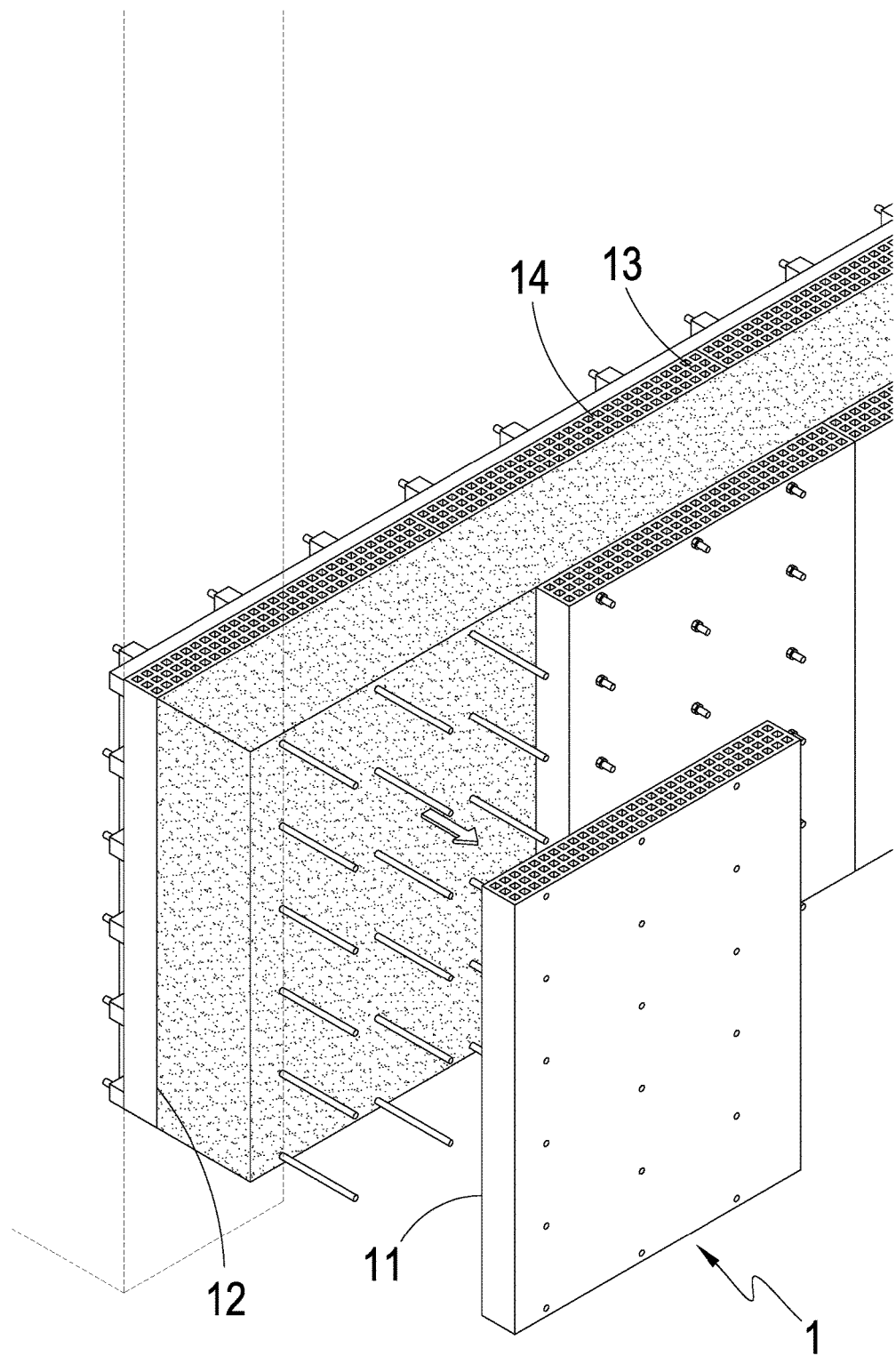
FIG. 7 is a perspective diagram showing the removal of a plastic form from the formwork of FIG. 6.

As shown in FIGS. 6 and 7, the main member 1 has a reduced weight for convenient and labor-saving transportation and installation. The main member 1 can also be further processed in situ such as cutting, sawing, drilling, fixing, etc. The connection ribs 14 and the intermediate layer 13 provide separation to prevent grout from leaking. As the first and second pieces 11 and 12 are smoothed and water-resistant, there is no need for advanced coating of moisture-resistant coating and stripping the main member 1 is also more convenient. There is also no need for a second treatment to flatten the surface of the finished concrete object. In addition, the main member 1 has enhanced structural strength and anti-deformation capability, and may be re-used for a greater number of times, thereby significantly lowering cost and resource consumption. When the main member 1 finally has to be abandoned, it may be chopped and recycled to build new main member 1. The main member 1 is therefore perfectly recyclable and totally environmentally friendly.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A plastic form, comprising a planar main member made from at least a plastic material mixed with a plurality of glass fiber particles; wherein the main member comprises:
    a first piece along a major face of the main member;
    a second piece along another major face of the main member opposite to the first piece;
    an intermediate layer sandwiched between the first and second pieces; and
    a plurality of connection ribs between the first and second pieces, partitioning the intermediate layer laterally and vertically and forming a plurality of through channels, where each through channel has openings at both ends;
    wherein each glass fiber particle comprises a glass fiber core and a reinforced glass fiber cladding wrapping the glass fiber core.

2. The plastic form according to claim 1, wherein the first and second pieces have smooth surfaces.

3. The plastic form according to claim 1, wherein the plastic material is further mixed with a plurality of rock particles.

4. A method of manufacturing a plastic form, comprising:
    providing a raw material by mixing a plastic material with a plurality of glass fiber particles, melting the raw material by an extrusion machine, and delivering the melted raw material to a hydraulic machine;
    pressurizing and feeding the melted raw material by the hydraulic machine into a distribution machine, distributing the melted raw material through a grid forming machine and into a mold for molding the melted raw material into an integrally formed main member having a first piece, a second piece, an intermediate layer, and a plurality of connection ribs, with a plurality of parallel through channels; and
    cutting and cooling the main member.

5. The method according to claim 4, wherein the step of cutting and cooling the main member comprises the following sub-steps:
- delivering the main member to a shaping machine for shaping;
- delivering the shaped main member to a first cutting device by a first traction machine, and pruning the shaped main member's rims;
- cooling the pruned main member by delivering the pruned main member to cooling rack;
- delivering the cooled main member to a second cutting device by a second traction machine, and cutting the cooled main member according to a desired length; and
- delivering the cut main member through a transportation device.

6. The method according to claim 4, wherein the first and second pieces have smooth surfaces.

7. The method according to claim 4, wherein each glass fiber particle comprises a glass fiber core and a reinforced glass fiber cladding wrapping the glass fiber core; and the raw material further comprises a plurality of rock particles.

8. The method according to claim 4, wherein the hydraulic machine, the grid forming machine, and the mold jointly providing an injection molding process for the main member.

9. The method according to claim 4, wherein the through channels are resulted from distributing the raw material through the grid forming machine; and the main member's width and thickness are jointly controlled by the grid forming machine and the mold.

\* \* \* \* \*